US009158548B2

(12) United States Patent
Szalay et al.

(10) Patent No.: US 9,158,548 B2
(45) Date of Patent: Oct. 13, 2015

(54) SYSTEM AND METHOD FOR PROGRAM AND RESOURCE ALLOCATION WITHIN A DATA-INTENSIVE COMPUTER (71) Applicants: Sandor Szalay, Baltimore, MD (US); Edward Givelberg, Baltimore, MD (US)

(72) Inventors: Sandor Szalay, Baltimore, MD (US); Edward Givelberg, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 176 days.

(21) Appl. No.: 14/078,083

(22) Filed: Nov. 12, 2013

(65) Prior Publication Data

US 2014/0137124 A1 May 15, 2014

Related U.S. Application Data (60) Provisional application No. 61/725,856, filed on Nov. 13, 2012.

(51) Int. Cl.
*G06F 9/46* (2006.01)
*G06F 9/44* (2006.01)
*G06F 9/50* (2006.01)
*G06F 9/48* (2006.01)

(52) U.S. Cl.
CPC ............... *G06F 9/44* (2013.01); *G06F 9/5072* (2013.01); *G06F 9/4881* (2013.01)

(58) Field of Classification Search
CPC ........ G06F 9/44; G06F 9/4881; G06F 9/5072
See application file for complete search history.

(56) References Cited

U.S. PATENT DOCUMENTS

| 8,046,373 | B2 | 10/2011 | Chen et al. |
| 8,190,827 | B2 | 5/2012 | Eidus et al. |
| 8,286,181 | B2 * | 10/2012 | Daute ........................... 718/106 |
| 2004/0088293 | A1 | 5/2004 | Daggett |
| 2010/0192148 | A1 | 7/2010 | Chen et al. |
| 2011/0060939 | A1 | 3/2011 | Singhal et al. |

OTHER PUBLICATIONS

Bryant, Data-Intensive Supercomputing: The Case for Disc, 2007, Carnegie Mellon University website at www.cs.cmu.edu/-bryant/pubdir/cmu-cs-07-128.pdf.

(Continued)

*Primary Examiner* — Camquy Truong
(74) *Attorney, Agent, or Firm* — Quarles & Brady, LLP (57) ABSTRACT A system and method for operating a data-intensive computer is provided. The data-intensive computer includes a processing sub-system formed by a plurality of processing node servers and a database sub-system formed by a plurality of database servers configured to form a collective database in excess of a petabyte of storage. The data-intensive computer also includes an operating system sub-system formed by a plurality of operating system servers that extend a unifying operating system environment across the processing sub-system, the database sub-system, and the operating system sub-system to act as components in a single data-intensive computer. The operating system sub-system is configured to coordinate execution of a single application as distributed processes having at least one of the distributed processes executed on the processing sub-system and at least one of the distributed processes executed on the database sub-system.

19 Claims, 5 Drawing Sheets

(56) References Cited

OTHER PUBLICATIONS

Givelberg, et al., MPI-DB, A Parallel Database Services Software Library for Scientific Computing, 2011, Springer-Verlag Berlin Heidelberg, Proceedings of the 18th European MPI Users' Group Meeting (EuroMPI 2011), pp. 339-341, skysrv.pha.jhu.edu/-givelberg/papers/EuroMPI2011.pdf.

Givelberg, et al., An Architecture for a Data-Intensive Computer, 2011, Johns Hopkins University website at (skysrv.pha.jhu.edu/-givelberg/papers/), skysrv.pha.jhu.edu/-givelberg/papers/DataIntensiveComputer.pdf.

Szalay, et al., Science in an Exponential World, Nature, 2006, 440:413-414.

* cited by examiner

SYSTEM AND METHOD FOR PROGRAM AND RESOURCE ALLOCATION WITHIN A DATA-INTENSIVE COMPUTER

This application is based on, claims priority to, and incorporates herein by reference in its entirety U.S. Provisional Application Ser. No. 61/725,856, filed Nov. 13, 2012, and entitled, "SYSTEM AND METHOD FOR PROGRAM AND RESOURCE ALLOCATION WITHIN A DATA-INTENSIVE COMPUTER".

STATEMENT REGARDING FEDERALLY SPONSORED RESEARCH

This invention was made with government support under grant number 1040114, awarded by the National Science Foundation. The government has certain rights in the invention.

BACKGROUND OF THE INVENTION

The field of the invention is specialized computing systems and methods for data intensive computing. More specifically, the present invention relates to systems and methods for memory and data management within a data intensive computer architecture capable of facilitating multi-petabyte data analysis.

The traditional process of scientific discovery consists of systematic observation, experimentation, measurement and data collection, leading to the creation of a theory that explains past observations and predicts the results of future experiments. In virtually every field of science, technological progress has led to the construction of high-throughput measurement instruments, such as telescopes, high-energy particle accelerators, gene sequencing machines, and the like. These high throughput measurement instruments generate very large data sets from observation of complex physical systems. On the other hand, theoretical description of complex physical phenomena starts with a set of basic laws, typically expressed as partial differential equations, whose consequences are investigated with the help of simulation experiments using computational models. The volume of data produced by computer simulations has been increasing even more rapidly than the size of empirical measurement data sets.

The availability of large experimental datasets coupled with the potential to analyze them computationally is changing the nature of science. In many cases, however, the ability to acquire experimental data outpaces the ability to process such data, leading to the so-called "data deluge." This data deluge is the outcome of three converging trends: the proliferation and availability of high throughput instruments, the increasing size and availability of mass storage devices to store the measurements, and the continuing evolution of processor design according to Moore's law.

As discussed above, the volume of data produced by computer simulations, used in virtually all scientific disciplines today, is increasing at an even faster rate than experimental data. The reason for this volumetric increase is, in many cases, the desire to preserve intermediate simulation steps for future reuse because the intermediate steps represent substantial computational investments. The sheer volume of these datasets is only one of the challenges that scientists must confront. For example, data analyses in some disciplines, such as environmental sciences, must span thousands of distinct datasets with incompatible formats and inconsistent metadata. Overall, dataset sizes follow a power law distribution and challenges abound at both extremes of this distribution.

Figure 1:
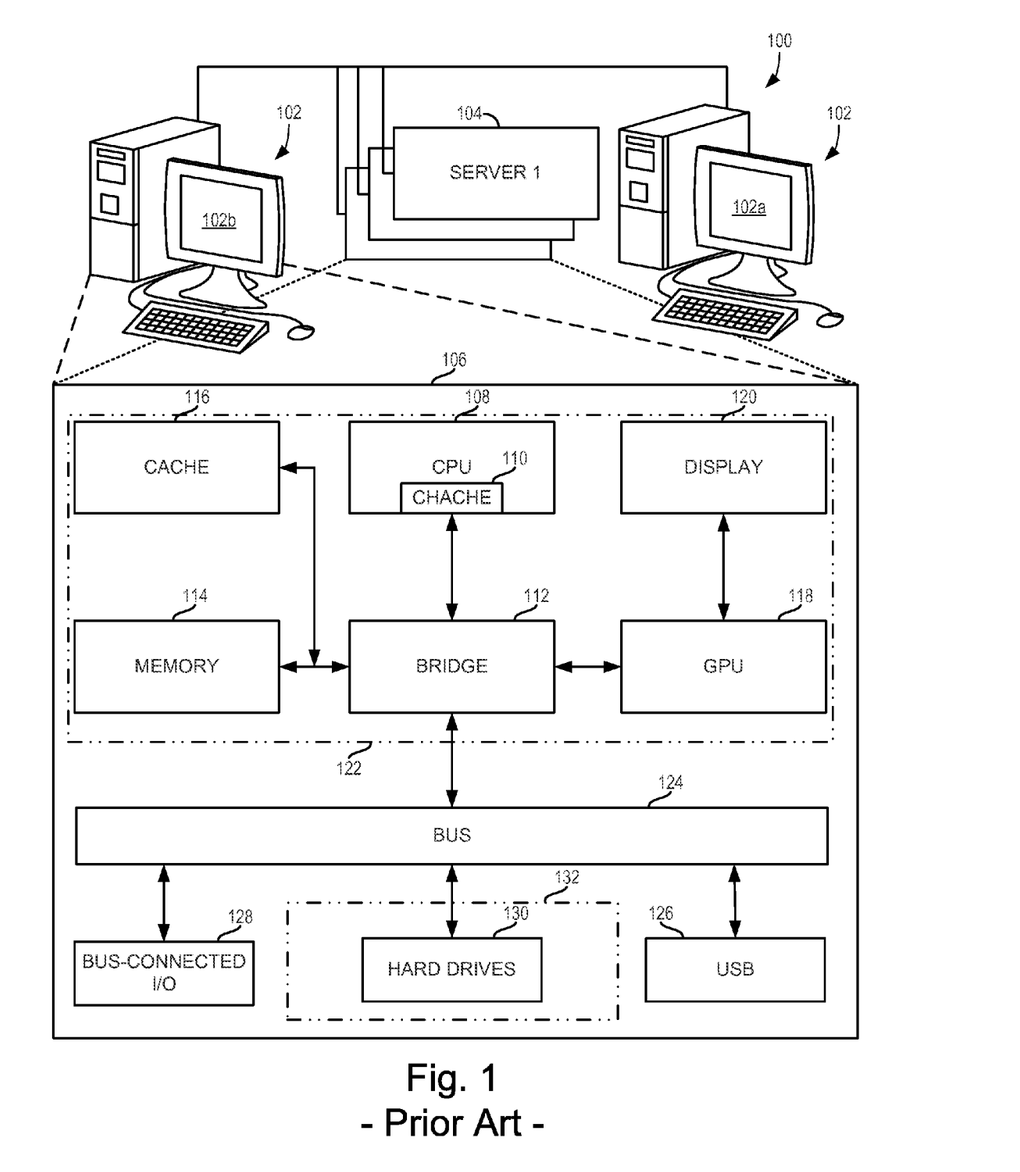
FIG. 1 is a schematic diagram of a traditional computer system and the architecture of computers and servers that form traditional computer system and networks.

While improvements in computer hardware have enabled this data explosion, the traditional computer architecture and components used within the traditional computer architecture has failed to keep pace. Referring to FIG. 1, a traditional computer network 100 is illustrated. The computer network 100 is formed by a plurality of workstations 102 that are connected to one or more servers 104. The workstations 102 may have more or less high-performance hardware systems and the servers 104 generally include more high-performance and substantially robust hardware systems than the workstations 102. However, regardless of the underlying performance of the hardware, such as clock speeds, memory size, and the like, the underlying hardware architecture of computer systems, both servers and workstations, and, by extension, the software architecture designed to operate these hardware architectures is generally similar and has been generally stagnant.

Specifically, referring to FIG. 1, a general hardware architecture 106 is illustrated that is representative of the hardware architecture employed in both workstations 102 and servers 104. Specifically, the hardware architecture 106 includes one or more CPUs 108. Trends in CPU designs have evolved over the years and have included increasing clock speeds, increasing density per chip, increasing chips per die, and increasing processors that together form the CPU 108. While each advancement has improved performance, computer hardware architecture since the earliest designs have maintained this design of a CPU 108, which may include one or more caches 110.

The CPU 108 is generally connected through a bridge 112 to memory 114 and, in some cases, an additional non-local cache 116. While memory and cache design evolutions have been great over the years, they generally adhere to the concept of placing one or more levels of comparatively fast random access memory in close proximity (access proximity) to the CPU 108. In more recent times, dedicated graphics processing units (GPUs) 118 have been adapted from processors utilized to simply drive a display 120 to a secondary, specialized processor that the CPU 108 can utilize to offload tasks fitting the specialized capabilities of the CPU 108, such as transcoding operations and many others. In any case, the general computer architecture 106, regardless of workstation or server, regardless of whether the computer architecture is from the 1990s or more recent times, provides a CPU 108 and memory 114 and may be supplemented by secondary processing and memory components, such as a GPU 118 and various caches 110, 116 dedicated to particular situations. In this regard, the above-described components may be conceptualized as a CPU/memory sub-system 122.

The computer architecture 106 also includes a bus or multiple buses 124 that connect the above-described CPU/memory sub-system 122 to other, slower components of the computer architecture 106. For example, the buses 124 may provide connections to a universal serial bus (USB) hub or controller 126 and/or dedicated, bus-connected I/O devices 128. Of course, I/O connections may vary substantially; however, in all cases, the bus 124 provides connections to one or more hard drives 130. These hard drives 130 may take many forms and, more recently, include hardware advances such as solid-state drives, but are uniformly present in workstations or personal computers 102 and servers 104. This is because all traditional notions of computer architecture can be conceptualized as, at a minimum, including a CPU/memory sub-system 122 and a mass-storage sub-system 132.

Despite great advances in the individual components of the traditional hardware architecture and the software designed to operate on the traditional hardware architecture, traditional computer architectures 106 include substantial limitations. For example, CPU performance has been doubling every 18 months, following Moore's Law. The capacity of disk drives is doubling at a similar rate, somewhat slower that the original Kryder's Law prediction, driven by higher density platters. On the other hand, disks' rotational speed has changed little over the last ten years. The result of this divergence is that, while sequential I/O speeds increase with density, random I/O speeds have changed only moderately. Due to the increasing difference between the sequential and random I/O speeds of disks, only sequential disk access is possible. More specifically, if a 100-terabyte computational problem requires mostly random access patterns, it cannot be done.

These and many other limitations of the traditional notions of computer architecture are substantially compounded when the computer systems are formed into a network. As described above, traditional computer architectures, generally, provide a substantial computing system at each point that is, generally, capable of autonomous operation; that is, each system includes a CPU/memory sub-system 122 and mass-storage sub-system 132. Accordingly, general notions of computers systems operating in a network and sharing network resources are limited by network speeds, even in a data center, that are unable to keep up with the doubling of the data sizes. In other words, with petabytes ("PB") of data, the data cannot be moved to where the computing occurs with sufficient speed.

The typical analysis pipeline of a data-intensive scientific problem starts with a low level data access pattern during which outliers are filtered out, aggregates are collected, or a subset of the data is selected based on custom criteria. The more CPU-intensive parts of the analysis happen during subsequent passes. Such analyses are currently implemented in academic Beowulf clusters that combine compute-intensive but storage-poor servers with network attached storage. These clusters can handle problems of a few tens of terabytes, but they do not scale above hundred terabytes because, for example, they may be constrained by the very-high costs of PB-scale enterprise storage systems. Furthermore, as these traditional systems grow to meet subsequent data needs, the power and space requirements for such systems exceed what is available to individual scientists and small research groups. In addition, existing supercomputers are not well suited for data intensive computations, at least in part because they maximize CPU cycles but lack I/O bandwidth to the mass storage layer. Most supercomputers also lack disk space adequate to store PB-size datasets over multi-month periods.

Furthermore, commercial cloud computing platforms are not a feasible solution. For example, recently, when mass storage becomes a limitation, remote or "cloud" storage is sought as a solution. However, when considering massive and data-intensive computer operations on the scale of PBs or factors of PBs, the data movement and access fees are excessive compared to purchasing physical disks, the I/O performance offered is substantially lower, and the amount of disk space provided is inadequate.

The above description of memory and storage architecture and hierarchy has remained essentially consistent for decades. For example, M. J. Murdocca and V. P. Heuring have accurately summarized this hierarchy from slow and inexpensive to fast and expensive in the following order: off-line/on-line storage, secondary storage, main memory, caches, registers. That is, this hierarchy and the results of this hierarchy have remained consistent in Murdocca et al.'s 1999 book that discussed this hierarchy, "Principles of Computer Architecture," in Murdocca et al.'s 2007 book that discussed this hierarchy, "Computer Architecture and Organization: An Integrated Approach," and continuing through more recent presentations on the subjects. However, as described above, traditional paradigms of computer architecture and the software constructs that operate on these traditional paradigms of computer architecture are incapable of handling data-intensive computing on the scale of PBs or factors of PBs.

Coupled with these shortcomings of traditional notions of computer hardware architecture are traditional notions of computer software architecture. Though not always correlated directly, many operational and design components of traditional computer software architectures are predicated on systemic features of traditional computer hardware and software. For example, the operating system of traditional computer systems is designed to balance program productivity with implementation efficiency.

Figure 2:
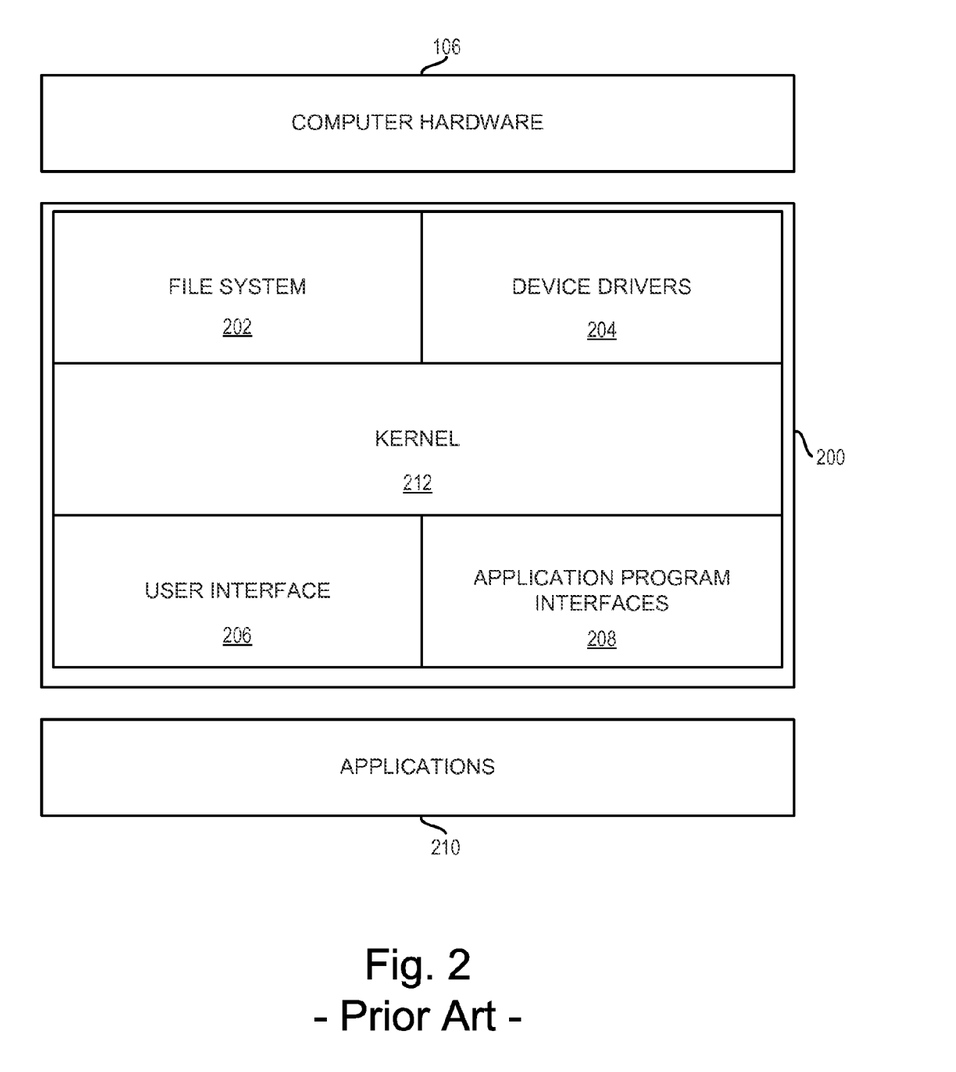
FIG. 2 is a schematic diagram of a traditional computer operating system for use with the computer system of FIG. 1 and illustrated with relation to applications designed for operation with the operating system of FIG. 2 and the hardware architecture of FIG. 1.

Referring to FIG. 2, the above-described computer hardware architecture 106 is coupled with an operating system 200. The operating system 200 can be represented as a plurality of sub-systems. On one end of the operating system 200 are a series of sub-systems, such as a file system 202 and device drivers 204, that are tightly designed with the computer hardware architecture 106 in mind. On the other end of the operating system 200 are a series of sub-systems, such as a user interface 206 and application program interfaces (APIs) 208, that are more tightly coupled to or provide the fundamental basis on which applications 210 can perform in concert with the operating system 200. At the heart of the operating system 200 is the kernel 212.

Though a simplification of the multitude of sub-systems included with the operating system 200 and even within the sub-systems illustrated in FIG. 2, the representation illustrates the influence of traditional computer hardware notions on operating system design and, further, illustrates that the combined standards of computer architecture and operating system substantially dictate the fundamentals of operation for applications 210. That is, traditional notions of computer programming are build upon the consistency of the above-described computer hardware and operating system architectures. For example, high-level programming languages hide the computer's memory hierarchy and system architecture, while the operating system provides highly optimized services for all application developers. The only means of permanently storing data is by writing it in a file, and the abstract programming model of sequential file access is efficiently implemented in the operating system. The operating system typically does not include services for handling high-level programming objects, such as arrays or graphs. When there is a need to store such objects for subsequent computation, the programmer must make use of the file system with serialization/unserialization of these objects.

Tied to these notions of high-level programming languages and traditional notions of computer operating systems are the fundamentals of traditional compilers. Because traditional compilers are focused on the creation of executable programs, traditional compilers are necessarily tied back to the fundamentals of the operating system 200 and the hardware architecture 106 described above. Unfortunately, as described above, these systems, both hardware and software, present substantial impediments to realizing data-intensive computing systems and methods on the order of PB or factors of PB.

It would therefore be desirable to provide a system and method for storing, transferring, and analyzing large sets of data, for example, at a minimum of the petabyte range.

SUMMARY OF THE INVENTION

The present invention overcomes the aforementioned drawbacks by providing a data-intensive computer that is formed from multiple server systems forming a processing and storage infrastructure that underlies the computer. Another system of servers provides a unifying operating system environment that coordinates operation of all of the servers to act as components in a single data-intensive computer. The servers providing the storage infrastructure collectively form a massive database, for example, in excess of a petabyte of storage. Applications running in data-intensive computer are executed as distributed processes, where some of the distributed process may be executed by the processing infrastructure and others executed by the storage infrastructure. The unifying operating system environment coordinates which processes are distributed to the processing infrastructure and which processes are distributed to the storage infrastructure.

In accordance with one aspect of the invention, a data-intensive computer is disclosed that includes a processing sub-system formed by a plurality of processing node servers and a database sub-system formed by a plurality of database servers configured to form a collective database in excess of a petabyte of storage. The data-intensive computer also includes an operating system sub-system formed by a plurality of operating system servers configured to extend a unifying operating system environment across the processing sub-system, the database sub-system, and the operating system sub-system to coordinate operation of the plurality of processing node servers, the plurality of database servers, and the plurality of operating system servers to act as components in a single data-intensive computer. The operating system sub-system is configured to coordinate execution of a single application as distributed processes having at least one of the distributed processes executed on the processing sub-system and at least one of the distributed processes executed on the database sub-system.

In accordance with another aspect of the present invention, a data-intensive computer is disclosed that includes a processing sub-system formed by a plurality of processing node servers and a database sub-system formed by a plurality of database servers configured to form a collective database in excess of a petabyte of storage. The data-intensive computer also includes an operating system sub-system formed by a plurality of operating system servers configured to extend a unifying operating system environment across the processing sub-system, the database sub-system, and the operating system sub-system using a system management layer, a data object layer, a database access layer, and a data transport layer to coordinate operation of the processing sub-system, the database sub-system, and the operating system sub-system. The operating system sub-system is configured to coordinate execution of a single application as distributed processes, wherein at least one of the distributed processes are executed on the processing sub-system and at least one of the distributed processes are executed on the database sub-system.

In accordance with yet another aspect of the present invention, a data-intensive computer is disclosed that includes a processing sub-system formed by a plurality of processing node servers and a database sub-system formed by a plurality of database servers configured to form a collective database in excess of a petabyte of storage. The data-intensive computer also includes an operating system sub-system formed by a plurality of operating system servers configured to extend a unifying operating system environment across the processing sub-system, the database sub-system, and the operating system sub-system to coordinate operation of the plurality of processing node servers, the plurality of database servers, and the plurality of operating system servers to act as components in a single data-intensive computer. The data-intensive computer further includes a compiler configured to receive uncompiled code and generate executable code configured to execute on the processing node servers and the database servers. The operating system sub-system is configured coordinate execution of the executable code to perform as a single application with processes executing in both the processing sub-system and the database sub-system and presenting the database sub-system to processes running in the processing sub-system as a layer in a memory hierarchy of the data-intensive computer.

In accordance with one aspect of the invention, a data-intensive computer is provided that includes a processing sub-system formed by a plurality of processing node servers and a database sub-system formed by a plurality of database servers configured to form a collective database in excess of a petabyte of storage. The data-intensive computer also includes an operating system sub-system formed by a plurality of operating system servers configured to extend a unifying operating system environment across the processing sub-system, the database sub-system, and the operating system sub-system to coordinate operation of the plurality of processing node servers, the plurality of database servers, and the plurality of operating system servers to act as components in a single data-intensive computer. The operating system sub-system is further configured to present the database sub-system to an application running in the processing sub-system as a layer in a memory hierarchy of the data-intensive computer.

In accordance with another aspect of the present invention, a data-intensive computer is disclosed that includes a processing sub-system formed by a plurality of processing node servers and a database sub-system formed by a plurality of database servers configured to form a collective database in excess of a petabyte of storage. The data-intensive computer also includes an operating system sub-system formed by a plurality of operating system servers configured to extend a unifying operating system environment across the processing sub-system, the database sub-system, and the operating system sub-system using a system management layer, a data object layer, a database access layer, and a data transport layer to coordinate operation of the processing sub-system, the database sub-system, and the operating system sub-system. The database access layer coordinates with the data object layer to present the database sub-system as a layer in a memory hierarchy of the data-intensive computer to applications executing, at least in part, at the processing sub-system.

In accordance with yet another aspect of the present invention, a data-intensive computer includes a processing sub-system formed by a plurality of processing node servers and a database sub-system formed by a plurality of database servers configured to form a collective database in excess of a petabyte of storage. The data-intensive computer also includes an operating system sub-system formed by a plurality of operating system servers configured to extend a unifying operating system environment across the processing sub-system, the database sub-system, and the operating system sub-system using a system management layer, a data object layer, a database access layer, and a data transport layer to coordinate operation of the processing sub-system, the database sub-system, and the operating system sub-system. The database access layer coordinates with the data object layer to present the database sub-system as a layer in a memory hierarchy of the data-intensive computer to applications executing, at least in part, at the processing sub-system. The operating system sub-system is configured to coordinate execution of a single application as distributed processes having at least one of the distributed processes executed on the processing sub-system and at least one of the distributed processes executed on the database sub-system.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Data sets, for example, scientific data sets are now approaching the petabyte ("PB") range, exceeding the capabilities of file systems, and are, therefore, often stored in databases. Data sets at or in excess of a PB are not easily accessible to computation because of input/output (I/O) limitations of traditional computer architectures, operating system designs, network configurations, and the like. Even in the context of a so-called high performance computing (HPC) system, substantial and data-intensive computing in PB or multi-PB databases is presently very difficult.

There are no "off-the-shelf" solutions and a considerable effort is required on the part of the human programmers to incorporate special-purpose database access tools to allow PB or multi-PB databases to be accessed and computations performed on small sub-sets of data stored on PB or multi-PB databases. That is, such computer networks that provide access to PB or multi-PB databases do so by allowing computer systems on the network to access and copy portions of the PB or multi-PB database to the local computer system.

Referring to FIG. 1, this operational flow is predicated on traditional notions of computer hardware and software architecture. That is, a portion of a PB or multi-PB database is accessible through server 104 and is copied over the network to a specific workstation 102a. The specific workstation 102a copies the portion of the PB or multi-PB database onto its local hard drives 130. Local applications installed on the local hard drive 130, as well as further, smaller portions of the data copied from the PB or multi-PB database are then copied into memory 114 and cache 110, 116, so that the local applications can perform operations on the locally-copied portions of the PB or multi-PB database.

Not only is this construct plagued by numerous, well-known issues of traditional file systems and distributed files systems and databases, such as interceding update issues and the like, it is highly inefficient. That is, even ignoring the well-known data management and file-system limitations of traditional hardware architectures and operating systems, the need to copy, locally-manipulate, and copy back large amounts of data, when extended to the scale of PB or multiple PBs, presents a burden that is compounded sufficiently as to make the process impractical. For example, the time required to copy just one PB of data from a multi-PB database over a computer network for local processing and then copy new instances of the one PB of data back to the multi-PB database renders the process impractical. Such impediments to working with large data sets, particularly when performing data-intensive operations on large data sets are compounded even further when data access is achieved using web services and the like. These solutions do not provide a scalable solution for many data-intensive applications. Furthermore, the resulting data flow throughput needs to be improved by orders of magnitude; even trivially parallelizable data processing tasks in such environments are very difficult.

In order to satisfy the increasing demand for computations with very large data sets, the present invention provides a hardware architecture, an operating system, and associated components, such as a compiler, that exploit the massive parallelism in a database system to efficiently carry out data storage and retrieval between the database and a multiprocessor computing system. Rather than designing stand-alone, networked computers (where the distinction between server and client is primarily reflected in the cost and performance of server hardware and additional "server-type features" in the server operating system), the present invention provides a system hardware and software architecture that is designed to "move the system to the data" rather than "move data back and forth to individual systems." See, for example, A. S. Szalay, J. Gray, "Science in an Exponential World", Nature, 440, pp 23-24, 2006. In doing so, the present invention provides a practical implementation to deliver on the concept of "moving the system to the data" by breaking from traditional notions of system architecture and network design. Specifically, the present invention breaks from traditional notions of autonomous systems joined by networks run by servers and data as a simple resource that this passed between autonomous systems. However, at the same time, it does not fall back on "thin-client-type designs" because such implementations are also unsuited to massive, data-intensive computing because thin-client-type designs push the computational burden onto a processing surrogate, which does not solve the above-detailed problems with data-intensive computing at the PB or multi-PB database scale. Rather, such implementations simply create new problems.

Figure 3A:
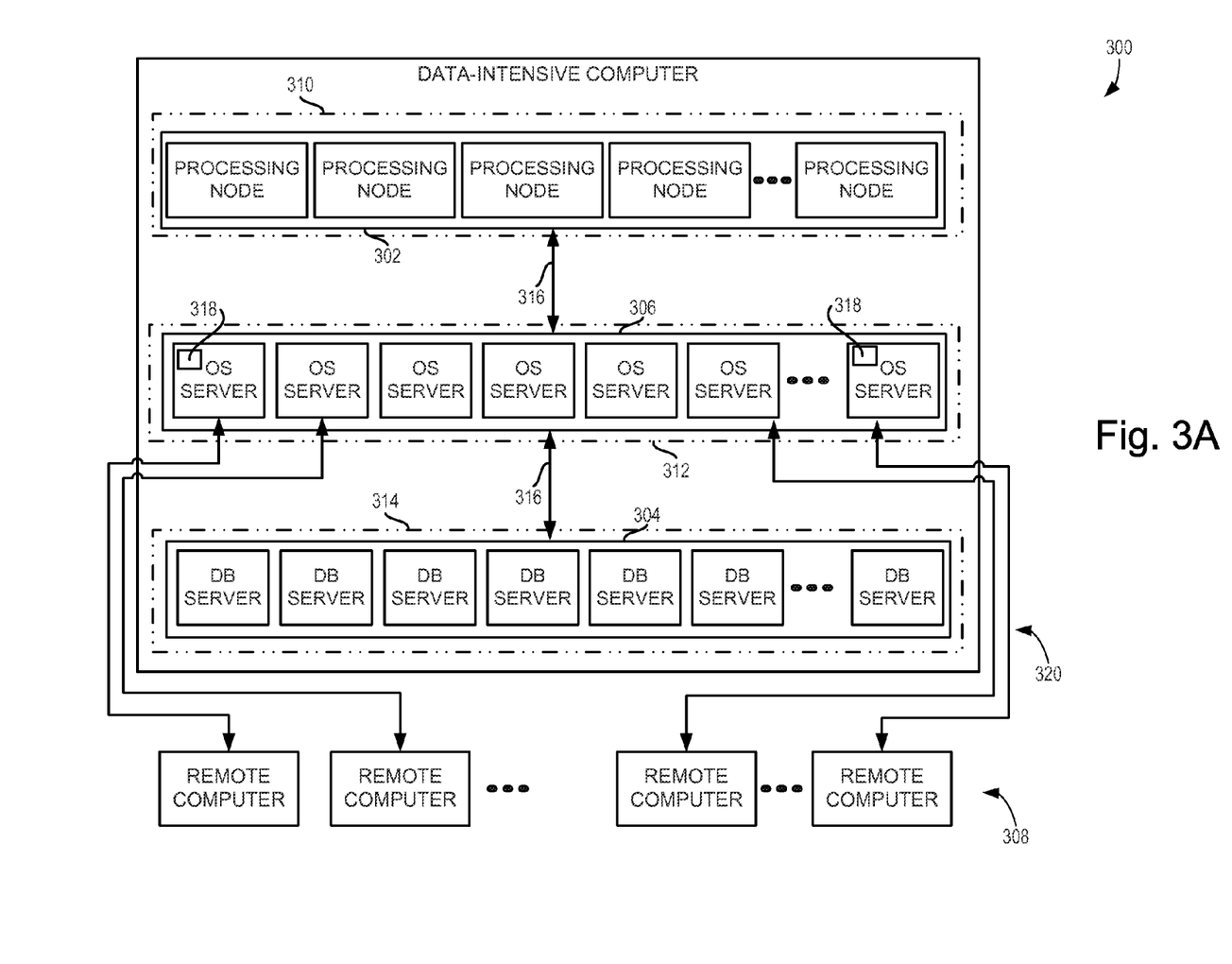
FIG. 3A is a schematic diagram of a data intensive computer architecture in accordance with the present invention.

In particular, referring to FIG. 3A, the present invention creates an integrated system, or "data-intensive computer" 300, where the sub-components include cluster of processing nodes 302, for example, a high performance computing (HPC) cluster, a series of parallel database servers 304, and an intermediate operating system cluster 306 that ties these systems together to operate as a single data-intensive computer 300 and not a group of autonomous systems with individual instances of operating systems that are merely joined by a network and/or shared resources. This data-intensive computer 300 is accessed by general remote computers 308 or even data-scopes, such as described in the co-pending application co-inventor Szalay directed to the data-scope concepts, which is incorporated herein by reference.

As will be described, the processing nodes 302, at a hierarchical level, form an extremely-high-powered processing sub-system 310 that serves within the data-intensive computer 300 of this example in a role akin to that of the CPU 108 in the traditional computer architecture of FIG. 1. The remote computers 308 are akin to the I/O devices, such as a display 120 or peripherals connected via USB connections 126 or bus-connected I/O connections 128 in the traditional computer architecture of FIG. 1. To join these systems and coordinate operation of the data-intensive computer 300, unlike traditional systems, the operating system servers 306, together, form an operating system sub-system 312. Generally, with reference to I/O between the processing nodes 302 and the database servers 304, the operating system servers 306 can provide quality service in the level of performance of the data flow and ensure scalability and efficient parallel scheduling and resource management. The operating system servers 306 operate together as an operating system sub-system 312 despite being formed of dedicated operating system servers 306.

Thus, the operating system sub-system 312 assists in forming a common or unifying data-intensive operating system (DIOS) across the data-intensive computer 300. The DIOS is a software suite that runs on all of the servers of the data-intensive computer 300. That is, the DIOS forms a unifying operating system environment that coordinates the operation of all of the servers to act as components in a single data-intensive computer 300. High-level user applications are transformed by DIOS into a collection of lower level parallel processes executed by the servers of each sub-system As such, the operating system sub-system 312 enables direct I/O operations between local memory of the processing nodes 302 and a database sub-system 314 formed by the database servers 304. In this regard, as will be described in further detail, the operating system sub-system 312 makes the database sub-system transparent to the programmer and effectively turns the database sub-system 314 into a layer in memory hierarchy of the data-intensive computer 300. Accordingly, a single, fluidly-operating data-intensive computer 300 is provided that can be accessed by the remote computers 308. That is, the operating system sub-system 312 extends a unifying operating system environment across the processing sub-system 310, the database sub-system 314, and the operating system sub-system 312 to coordinate operation of the plurality of processing node servers 302, plurality of database servers 304, and plurality of operating system servers 306 to act as components in a single data-intensive computer 300.

Notably and as will be further detailed, the data intensive computer 300 provides a hardware architecture that can maximize stream processing throughput over 100 terabyte ("TB") size datasets for example, while using commodity components to keep acquisition and maintenance costs low. For example, accessing the data in a massively parallel fashion from the processing nodes 302 via locally attached disks and solid-state drives (SSDs) is significantly faster than serving the data from shared network file servers to multiple computer servers when investing in hardware at the same costs. As will be described in greater detail with respect to FIG. 3B, the operating system sub-system 312 establishes peer-to-peer connections between nodes on the processing sub-system 310 and the remote computers 308. As such, the operating system sub-system 312 enables on-the-fly ingest of data generated by a message passing interface ("MPI") application running between the data-scope I/O nodes 308 and the data-intensive computer 300, and for parallel compute-intensive analysis of large data set reads from the database servers 304.

The data stored in the database sub-system 314 is partitioned into blocks. In the course of an application execution data blocks are communicated by DIOS between the database sub-system 314 and the processing servers 310. The DIOS may use a database management system (DBMS) to effectively transform the data sub-system 314 into a memory layer of the data-intensive computer 300. An aspect of the present invention is that the DBMS or other system is used to implement random access memory (RAM) functionality in the data-intensive computer 300. This means that accessing (storing and retrieving) a block of data uses approximately the same amount of time, regardless of the physical location of the data block. For a data set consisting of N blocks the RAM functionality within the data-intensive computer provides an $O(\log(N))$ access time to any one of the blocks of data. Within this context, to function as a "database" in the data-intensive computer 300, a given database server should, for example, provide $O(\log N)$ time access to a memory page. This may be realized by a system using binary trees. Rather than implement a system that will provide such RAM functionality for a Petascale data set from scratch, the database of the database sub-system 314 may be used.

Figure 3B:
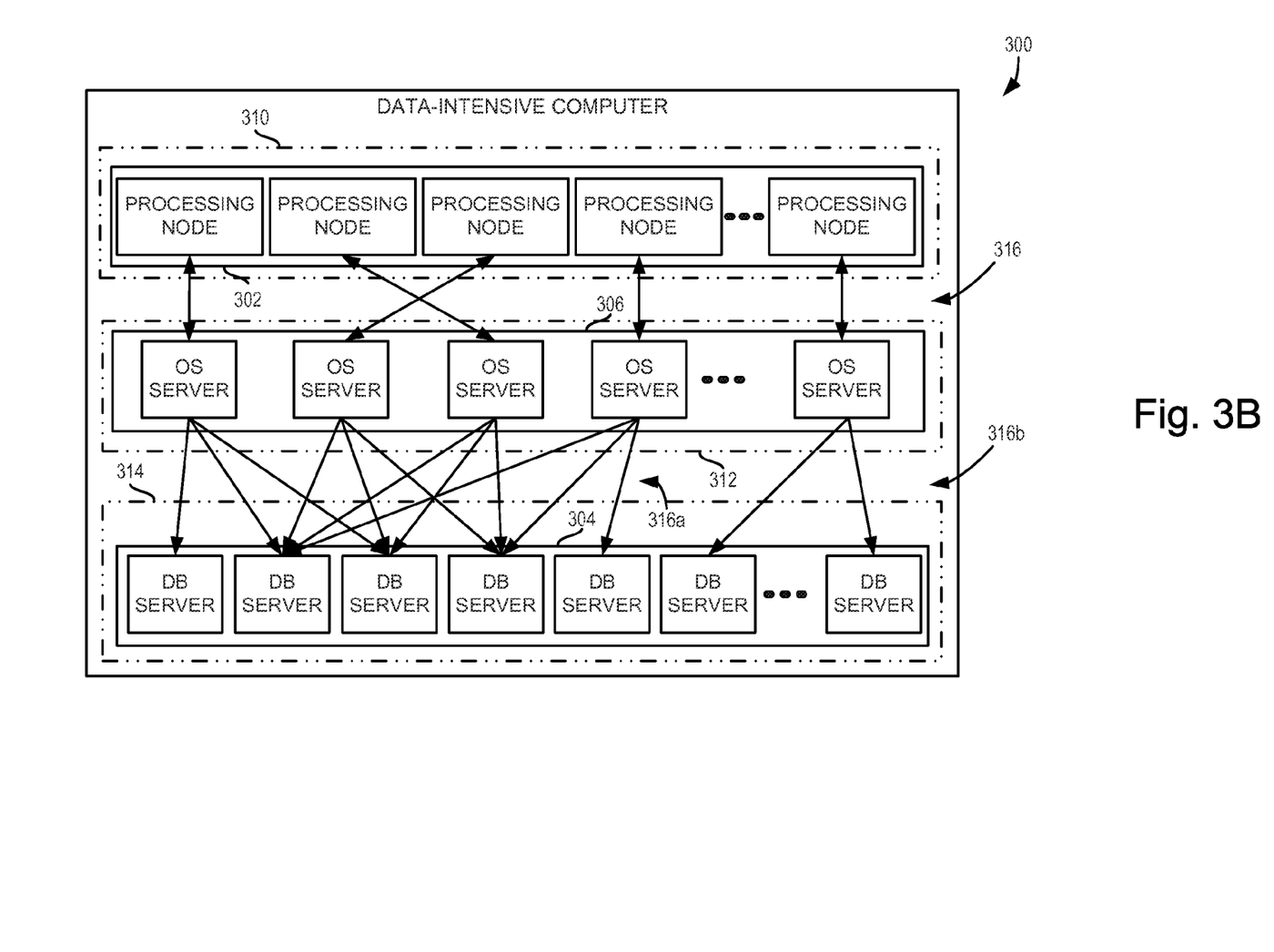
FIG. 3B is a schematic diagram illustrating data connections within the data intensive computer of FIG. 3A.

Referring to FIGS. 3A and 3B, as illustrated, the operating system sub-system 312 can be distributed to run on a set of dedicated operating system servers 306. The individual database servers 304 and processing nodes 302 can be connected to the operating system servers 306 by a high-bandwidth network 316, allowing transparent and scalable I/O between the processing nodes 302 and the database servers 304. In addition, the operating system servers 306 can also provide services to the remote computers 308. In one specific example, the data intensive computer 300 can include 90 processing nodes 302 and 12 database servers 304, and the processing nodes 302 can include about 4000 CPU cores. In this example, the total disk capacity can exceed 5 petabytes ("PB"), with, for example, 3 PB in a storage-specific layer and 2.2 PB dedicated to a performance-specific layer. The peak aggregate sequential I/O performance can be about 460 to about 500 gigabytes/second, with about 600 Teraflops of GPU computing.

The above-described hardware architecture of the data-intensive computer 300 is integrated through the software that controls the collection of servers 302, 304, 306, that traditionally were operated as coordinated autonomous systems, together as a single data-Intensive computer. To do so, the software includes a variety of features not common to traditional notions of operating systems. However, it is notable that this new architecture is likewise reflected in the hardware described above with respect to FIGS. 3A and 3B. Specifically, unlike traditional computer systems, the data-intensive computer 300 utilizes a series of operating system servers 306 that, as illustrated in FIG. 3B may, for example, be designed to coordinate connections to multiple of the individual database servers 304 and provide memory-level access to these resources to the processing nodes 302. Thus, though employing an entire system of what traditional notions characterize as a "computer" or "server," the data-intensive computer 300 operates such that the processing nodes 302 operate in coordination as the processing sub-system 310, similarly to that of a multi-core CPU, and accesses the database servers 304 as a memory-level resource through the coordination of the operating system sub-system 312.

Applications running on the processing nodes 302 of FIGS. 3A and 3B operate as clients for operating system processes, and the operating system servers 306 of FIGS. 3A and 3B can communicate with one or more database servers 304 for each process, as shown in FIG. 3B. Since execution of database queries is slower than the transmission of the results over the high bandwidth network 316, it is advantageous to execute queries on multiple database servers 304 in parallel. Accordingly, the operating system servers 306 act as a distributed scheduler for the database servers 304, where each dedicated operating system server 306 process allocates multiple database server connections 316a for data-intensive applications, and fewer database server connections 316b for applications with lower data requirements. This design is scalable and is aimed at minimizing application I/O by employing smart heuristic scheduling algorithms. That is, the operating system servers 306 are configured to monitor data requirements of a given application and facilitate access to the database sub-system 314 based on the data requirements of the application.

In addition, the operating system servers 306 can transform application burst I/O into uniform, balanced traffic across the database servers 304. More specifically, when a large number of applications are accessing the same data set, efficiencies may be realized by grouping the I/O requests of different applications together. The operating system servers 306 can maintain storage local to the operating system servers 306 for caching I/O requests and can optimize database access based on an applications' access patterns, as well as across applications. The operating system sub-system 312 can, therefore, incorporate efficient management of available resources, and can grow or shrink on demand.

Another exemplary feature of the operating system servers 306 is to enable applications with an arbitrary mix of I/O and computation. In many instances, it is advantageous to carry out computations with large data objects in a database. This "move the program to the data" approach is implemented by the data-intensive computer 300 as a fundamental tenet and realized in a way that is not possible with traditional computer systems. In traditional systems, an attempt to move the program to the data results in requests that may trigger execution of predefined routines in the database, and such routines may be pre-programmed in the database, causing additional human programming time. The present invention extends the "move the program to the data" approach by automatically generating the code that will be executed in the database servers 304. For example, an application running at the processing nodes 302, as will be described, is compiled into code that will execute on the processing nodes 302, as well as code for computations with operating-system-supported data objects that will execute on the database servers 304. The operating system sub-system 312 will, therefore, carry out "moving the program to the data".

Specifically, compiler-generated code for large data object computations will be sent from the processing nodes 302 to the database servers 304 using the operating system servers 306 and their inherent client-server communications systems. The user application running on the processing nodes 302 will be linked against the operating system client software. At run time, the user application will execute code on the processing sub-system 310, call system services that will execute in the operating system sub-system 312 and execute the application-generated code in the database sub-system 314.

User applications can be developed in a high-level programming language (such as Fortran, C, C++, and the like) that includes mechanisms for concurrency control (such as MPI), allowing easy porting of legacy applications to the data-intensive computer 300. It is also contemplated that a specially designed language, such as Titanium (produced by Appcelerator, Inc.) or Charm++, which has a built-in mechanism for concurrency control, can also be used for application development. However, it is contemplated that, in some cases, it may be advantageous to design a special purpose language for processing large data sets, as it may improve programmer productivity.

While a specific data object stored in the database sub-system 314 may be logically represented as a single object, its storage layout may be distributed among database servers 304. In the process of reducing a run-time distributed data object to a logically single object stored in the database sub-system 314, the operating system sub-system 312 can generate a physical mapping of the object's storage layout in the database sub-system 314. This mapping can identify the specific database servers 304, any server-attached storage, and the storage partitions that hold the data representing the object, and can determine methods for access and modification of the object.

Thus, the operating system sub-system 312 may be configured to coordinate execution of a single application as distributed processes having at least one of the distributed processes executed on the processing sub-system 310 and at least one of the distributed processes executed on the database sub-system 314. To this end, the operating system sub-system 312 can provide a compiler 318 automatically generate executable code directed to the processing node severs 302 and/or the database severs 304 to coordinate execution of a single application as distributed processes. The compiler 318 is configured to receive uncompiled code from a remote computer 308 connected to the data-intensive computer 300 and generate executable code configured to execute on, for example, the processing node servers 302, the operating system servers 306, and the database servers 304, or subsets thereof.

Referring to FIG. 3A, in some implementations, the data-intensive computer 300 may be designed for collaborative, non-local operating system services. For example, a large data set is typically created and processed by a large group of collaborating individuals, who execute a set of concurrent processes. Thus, remote computers 308 can obtain services from the data-intensive operating system sub-system 312 in a manner similar to that of the applications running on the processing nodes 302, as described above. More specifically, an application running on a remote computer 308 is compiled into code that executes on that remote computer 308, connects to the data-intensive operating system sub-system 312 over network connections 320 and sends to the code that the operating system sub-system 312 provides for execution within the database sub-system 314. Thus, one difference between communication with applications running on the processing sub-system 310 and a remote-computer 308 is the network connection speed, as the network connections 320 to the remote computers 308 are not as fast as the high-speed network connections 316 within the data-intensive computer 300.

Remote users with slow network connections can choose to download portions of data sets from the database sub-system 314 to their remote computers 308, perform extensive local computations, and send results back to the database sub-system 314. Furthermore, the operating system sub-system 312 of the data-intensive computer 300 can be used as a software library accessible by the remote computer 308 and run in conjunction with the database sub-system 314 to enable the user to store data objects imported from a remote database directly into the database sub-system 314, and to process the data in the database sub-system 314 using the same program that was previously created for remote, possibly large-scale, data processing.

As described generally above, the operating system sub-system 112 can support large-scale collaborative computations where user applications can be translated into code that runs on a remote computer and code that runs in the database.

In this manner, the data-intensive computer 300 can act as a subscription service, giving remote data users fast access to large data sets.

Figure 4:
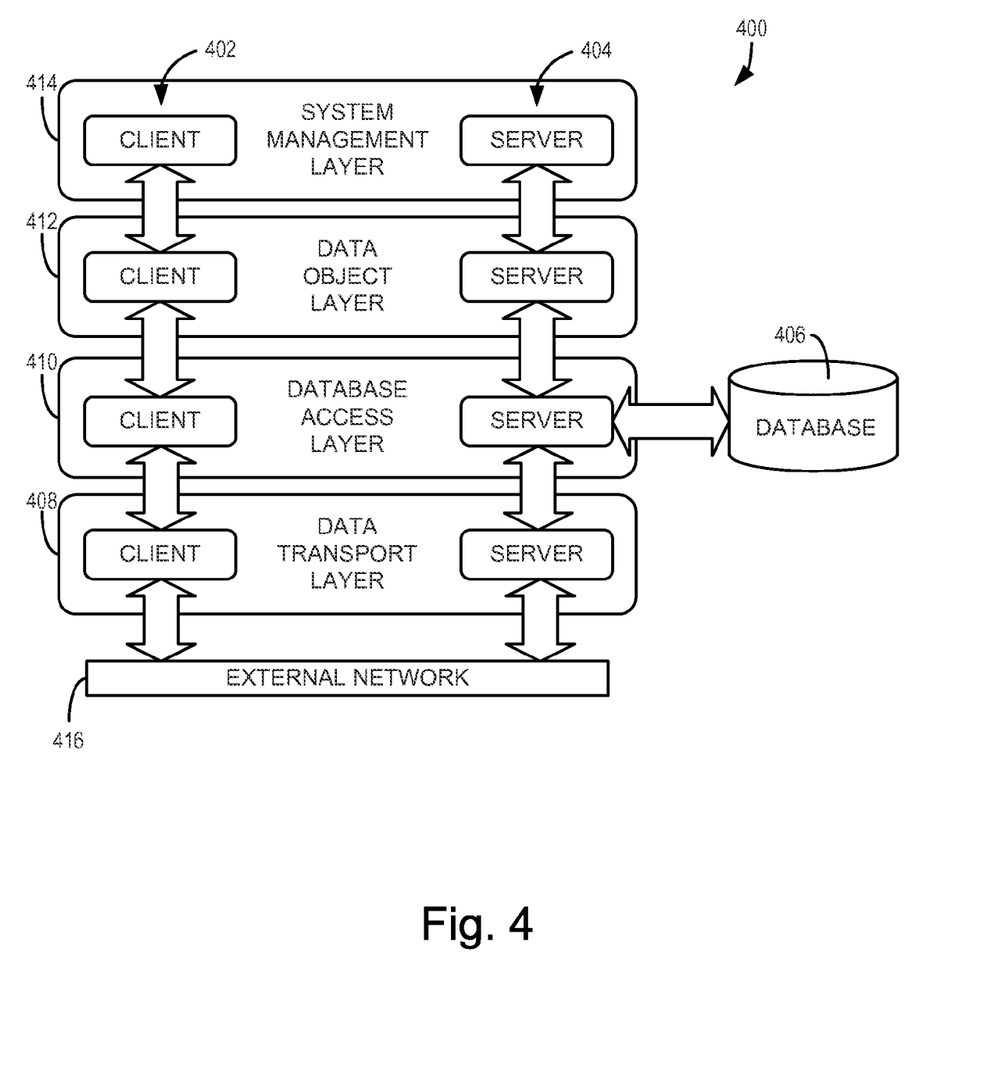
FIG. 4 is a schematic diagram of an operating system for use with the data intensive computer of FIGS. 3A and 3B.

Referring to FIG. 4, a schematic illustration of the software architecture of the data-intensive computer is illustrated. The following paragraphs describe an example operating system, implemented as a software library, referred herein as the message-passing-interface, database (MPI-DB) 400, for the data intensive computer. The software library provides database services to scientific computing processes and supports SQL-Server and MySQL databases on Windows and Linux with C, C++ and Fortran language bindings.

At a basic level, referring to FIG. 4, the library can be conceptualized as including two compatible software packages: a client package 402 and a server package 404. The library can require a working MPI installation and UDT (a UDP based Data Transfer protocol) sockets for its client-server communications. User applications are compiled and linked against the client. The server accepts connections from clients at a known network address, services clients' requests by querying a database 406 and sending the results back to the clients.

With reference to software architecture, MPI-DB 400 can be built as a layered structure, as shown in FIG. 4, analogous to multi-layer protocols used in computer network communications. Such a design is flexible and extensible. This layered structure can include a data transport layer 408, a database access layer 410, a data object layer 412, and a system management layer 414.

As shown in FIG. 4, the data transport layer 408 is the lowest layer in the hierarchy of the MPI-DB 400. The data transport layer 408 can provide the basic functionality for establishing and managing the connection between clients and servers over an external network 416. Notably, the external network 416 is external to the high-bandwidth network 316 that is internal to the data-intensive computer 300 of FIGS. 3A and 3B. This design encapsulates packet transmission in the data transport layer 408 and may include two implementations of the data transport layer: one using UDT (a UDP based Data Transfer protocol) sockets and the other using the MPI-2 standard, as further discussed below. As noted above, the MPI protocol is a widely-used standard in scientific computing. MPI installations are available for a wide range of operating systems and computer networks, and in many instances benchmarking tests have shown MPI to be among the fastest, currently-available, protocols for data transfer.

The database access layer 410 provides basic functionality to remotely execute queries and access the database 406. The database access layer provides the data object layer 412 with a narrow set of abstract operations needed to manipulate MPI-DB programming objects in the database 406. The data access layer 410 encapsulates all SQL queries and includes drivers for major databases, such as SQL Server, MySQL and PostgreSQL.

The data object layer 412 contains the description of the user-defined programming objects that are stored in the database 406, including their physical storage layout, and provides access and manipulation methods for these objects. User-defined objects are serialized by the associated client 402, sent to the server 404, and unserialized by the server 404, to be subsequently stored in the database 406. A hierarchical description of the physical storage layout lists the servers, the server-attached databases, and the storage partitions holding the data associated with each object. Data access methods implement the mapping between user-defined run-time partition of the object among multiple processors and the object's hierarchical database storage layout. Thus, the data object layer facilitates the presentation of the database subsystem as a layer in a memory hierarchy of the data-intensive computer to applications executing, at least in part, at the processing sub-system.

The system management layer 414 maintains a resource map, describing all the resources (storage and servers) available in the global database system. It includes a caching system for grouping applications' I/O requests and a scheduler assigning the I/O requests to the database servers of FIGS. 3A and 3B. The system management layer 414 can also handle administration functions, managing all user related information, including managing user logins and monitoring user connections.

With respect to implementation of the software library, the MPI-DB 400 can be developed as object-oriented software in C++ and, in some cases, made available under a BSD open-source software license. Features may include a working implementation of the MPI standard, including MPI-2 functionality, and can include software functions for client-server interaction (MPI_Open_Port, etc.) and dynamic process management (MPI_Comm_spawn).

An example use of the software library is described below for a scientific application consisting of several parallel MPI processes continuously generating output that needs to be stored (specifically, by the software library to a database). In this example, the user application is written in C++ with MPI. It is linked against the software library and there are two parallel processes at runtime, whose ranks are 0 and 1.

The user interaction with the software library starts by defining the data structures that will be stored in the database. In this example, the two parallel MPI processes jointly perform a computation using a single three-dimensional array of 128×128×128 double precision floating point numbers. The array is divided between the two processors, with processor 0 holding in its local memory the [0 . . . 127]×[0 . . . 127]× [0 . . . 63] portion of the array and processor 1 holding the [0 . . . 127]×[0 . . . 127]×[64 . . . 127] part. Correspondingly, each process defines an mpidb::Domain object subdomain and an mpidb::Array object a. The exemplary code is as follows:

```
// this user process has rank = MyID ,
// which in our example is either 0 or 1
MPI_Comm_rank(MPI_COMM_WORLD , &MyID);
mpidb : : Domain subdomain(0, 127, 0, 127, 64*MyID, 64*MyID+63)
mpidb : : Array a (subdomain, mpidb : : DOUBLE_PRECISION);
// generate a stream of array data objects
mpidb : : DataStream s(a);
mpidb : : DataSet d( );
// DataSet d is a single object, common to both process
// DataSet d will contain two data streams
d.AddStream(s);
```

The application will perform repeated computation of the data array, with each process periodically storing its portion of the data array in the database. Each process will therefore generate a stream of arrays. This is expressed in the definition of the mpidb::DataStream object s.

Finally, the application defines the mpidb::DataSet object d, which, in contrast to previously defined objects, is a single (distributed) object common to both processes. After each process adds a data stream to this data set, it will contain two streams.

Having defined the data structures, each of the two MPI processes attempts to establish a connection with an MPI-DB server. This is achieved by defining an mpidb::Connection object c and executing on it the ConnectToServer method with a given server address. Exemplary code is as follows:

```
mpidb : :Connection c;
char * ServerAddress = "128.220.233.155 : : 52415";
if (!c.ConnectToServer(ServerAddress))
{
    cerr << "Failed to connected to server . . . disconnecting" << endl;
    return 0;
}
else
    cout << "Connected to server at : " << ServerAddress << endl;
```

Upon successful connection, each of the two MPI processes respectively processes their own mpidb::Connection object c and each is allocated a dedicated MPI-DB server thread to service requests over this connection.

The connection object can now be used by each process to login to the database and create there a new data set, according to the previous definition of the mpidb::DataSet object d. Exemplary code as follows:

```
if (!c.AccessDataBase(username, password)
{
    cerr << "Faded to access the database." << endl;
    return 0;
}
// create an image of d in the database
If (!c.CreateDataSet(d))
{
    cerr << "Failed to create a new data set" << endl;
    return 0;
}
```

In addition to creating the data set in the database, the CreateDataSet method performs an operation of associating (binding) the user mpidb::DataSet object d with the corresponding database data set using the mpidb::Connection object c. The data can now be generated and stored in the database. The local portion of the data array may be called data. Exemplary code is as follows:

```
// the local portion of the 128x128x128 array
double data [128] [128] [64];
for (int TimeStep = 0; TimeStep < MaxTimeStep; TimeStep ++)
{
    // compute the values of the local data array
    ComputeValues(data);
    // push the values of data into the DataStream s
    s << data;
}
c.DisconnectFromServer();
```

After computing the new values of data, the data is stored in the database with the single instruction s<<data, which pushes the content of the array data into the stream s using the connection c. At the end of the program each process disconnects from the MPI-DB server.

The above example demonstrates how a scientific application can store arrays in the database. The user is no longer required to write SQL queries and be concerned with the layout of the tables in the database. The MPI-DB construct provides the user with a set of programming objects (data structures and methods to manipulate the data structures) that is flexible and sufficient for most data-intensive applications, such as scientific applications. In some cases, the ability to access database tables directly can be exposed to advanced users with specialized needs through the lower layers of the MPI-DB software library.

The present invention has been described in terms of one or more preferred embodiments, and it should be appreciated that many equivalents, alternatives, variations, and modifications, aside from those expressly stated, are possible and within the scope of the invention.

What is claimed is:

1. A data-intensive computer comprising:
   a processing sub-system formed by a plurality of processing node servers;
   a database sub-system formed by a plurality of database servers configured to form a collective database in excess of a petabyte of storage;
   an operating system sub-system formed by a plurality of operating system servers configured to extend a unifying operating system environment across the processing sub-system, the database sub-system, and the operating system subsystem to coordinate operation of the plurality of processing node servers, the plurality of database servers, and the plurality of operating system servers to act as components in a single data-intensive computer; and
   wherein the operating system sub-system is configured to coordinate execution of a single application as distributed processes having at least one of the distributed processes executed on the processing sub-system and at least one of the distributed processes executed on the database sub-system.

2. The data-intensive computer of claim 1 wherein the operating system sub-system is further configured to automatically generate executable code directed to one of the plurality of processing node servers and the plurality of database servers to coordinate execution of the single application as distributed processes.

3. The data-intensive computer of claim 1 wherein the operating system sub-system is further configured to provide a compiler configured to receive uncompiled code from a remote computer in communication with the data-intensive computer and generate executable code configured to execute on the plurality of processing node servers and the plurality of database servers.

4. The data-intensive computer of claim 3 wherein the executable code includes code directed to be executed by each of the plurality of processing node servers and the plurality of database servers to coordinate execution of the single application as distributed processes.

5. The data-intensive computer of claim 1 wherein the operating system sub-system is further configured to present the database sub-system to the single application as a layer in a memory hierarchy of the data-intensive computer.

6. The data-intensive computer of claim 1 wherein the plurality of operating system servers are configured to monitor data requirements of the single application and dynamically allocate and reduce a number of parallel connections to the database sub-system based on data requirements of the single application.

7. The data-intensive computer of claim 6 wherein the plurality of operating system servers act as a distributed scheduler for the plurality of database servers to dynamically allocate and reduce the number of parallel connections to the plurality of database servers in the database sub-system based on the data requirements of the single application.

8. The data-intensive computer of claim 1 wherein the operating system sub-system is configured to logically represent a specific data object stored in the database sub-system as a single data object when the specific data object is physically distributed across the plurality of database servers of the database subsystem.

9. The data-intensive computer of claim 8 wherein the operating system sub-system is configured to generate a physical mapping of the specific data object physically distributed across the plurality of database servers of the database subsystem and utilize the physical mapping to present the specific data object as the single object to the single application.

10. The data-intensive computer of claim 1 wherein the data transport layer is configured to manage connections by client computers accessing the data-intensive computer over a network external to the data-intensive computer using at least two independent implementations of the data transport layer, wherein a first implementation of the data transport layer uses user-defined types (UDT) sockets and a second implementation of the data transport layer uses message passing interface (MPI) protocols.

11. The data-intensive computer of claim 10 wherein the MPI protocols are implemented according to an MPI-2 standard.

12. The data-intensive computer of claim 1 wherein the database access layer facilitates execution of queries and access requests implicating the database sub-system.

13. The data-intensive computer of claim 1 wherein the data object layer contains a description of user-defined programming objects stored in the database sub-system.

14. The data-intensive computer of claim 1 wherein database access layer coordinates with the data object layer to present the database sub-system as a layer in a memory hierarchy of the data-intensive computer to applications executing, at least in part, at the processing sub-system.

15. The data-intensive computer of claim 1 wherein the unifying operating system environment presents a server software package and a client software package and wherein the sever software package is implemented using the UDT sockets and the client software package is implemented using the MPI protocols.

16. A data-intensive computer comprising:
a processing sub-system formed by a plurality of processing node servers;
a database sub-system formed by a plurality of database servers configured to form a collective database in excess of a petabyte of storage;
an operating system sub-system formed by a plurality of operating system servers configured to extend a unifying operating system environment across the processing sub-system, the database sub-system, and the operating system sub-system using a system management layer, a data object layer, a database access layer, and a data transport layer to coordinate operation of the processing sub-system, the database sub-system, and the operating system sub-system; and
wherein the operating system sub-system is configured to coordinate execution of a single application as distributed processes, wherein at least one of the distributed processes are executed on the processing sub-system and at least one of the distributed processes are executed on the database sub-system.

17. The data-intensive computer of claim 16 wherein the database access layer coordinates with the data object layer to present the database sub-system as a layer in a memory hierarchy of the data-intensive computer to applications executing,
at least in part, at the processing sub-system.

18. The data-intensive computer of claim 16 wherein the operating system servers are configured to monitor data requirements of the single application and dynamically allocate and reduce a number of parallel connections to the database sub-system based on data requirements of the single application.

19. A data-intensive computer comprising:
a processing sub-system formed by a plurality of processing node servers;
a database sub-system formed by a plurality of database servers configured to form a collective database in excess of a petabyte of storage;
an operating system sub-system formed by a plurality of operating system servers configured to extend a unifying operating system environment across the processing sub-system, the database sub-system, and the operating system sub-system to coordinate operation of the plurality of processing node servers, the plurality of database servers, and the plurality of operating system servers to act as components in a single data-intensive computer; a compiler configured to receive uncompiled code and generate executable code configured to execute on the processing node servers and the database servers; and
wherein the operating system sub-system is configured coordinate execution of the executable code to perform as a single application with processes executing in both the processing sub-system and the database sub-system and presenting the database sub-system to processes running in the processing subsystem as a layer in a memory hierarchy of the data-intensive computer.

* * * * *